(12) United States Patent
Hebert

(10) Patent No.: US 10,515,151 B2
(45) Date of Patent: Dec. 24, 2019

(54) CONCEPT IDENTIFICATION AND CAPTURE

(71) Applicant: Nuance Communications, Inc., Burlington, MA (US)

(72) Inventor: Matthieu Hebert, Melocheville (CA)

(73) Assignee: Nuance Communications, Inc., Burlington, MA (US)

( * ) Notice: Subject to any disclaimer, the term of this patent is extended or adjusted under 35 U.S.C. 154(b) by 40 days.

(21) Appl. No.: 14/461,589

(22) Filed: Aug. 18, 2014

(65) Prior Publication Data
US 2016/0048500 A1 Feb. 18, 2016

(51) Int. Cl.
| | |
|---|---|
| G06F 3/048 | (2013.01) |
| G06F 3/00 | (2006.01) |
| G06F 17/00 | (2019.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |

(Continued)

(52) U.S. Cl.
CPC .......... *G06F 17/278* (2013.01); *G06F 17/243* (2013.01)

(58) Field of Classification Search
CPC ........ G06F 9/4448; G10L 15/265; G06K 9/18
See application file for complete search history.

(56) References Cited

U.S. PATENT DOCUMENTS 5,819,261 A * 10/1998 Takahashi ......... G06F 17/30017
6,233,547 B1 * 5/2001 Denber ................. G06F 17/271
704/9

(Continued)

FOREIGN PATENT DOCUMENTS

| CN | 101763341 A | 6/2010 |
|---|---|---|
| CN | 103294657 A | 9/2013 |

(Continued)

OTHER PUBLICATIONS

"Stanford Named Entity Recognizer (NER)," The Stanford NLP (Natural Language Processing) Group, accessed Apr. 1, 2015, from http://nlp.stanford.edu/software/CRF-NER.shtml, 4 pages.

(Continued)

*Primary Examiner* — Seong-Ah A Shin
(74) *Attorney, Agent, or Firm* — Brian J. Colandreo; Michael T. Abramson; Holland & Knight LLP

(57) ABSTRACT

Disclosed methods and systems are directed to concept identification and capture. The methods and systems may include receiving, by a device, a first natural language input comprising one or more terms, and analyzing the first natural language input via a natural language processing engine to identify one or more named entities associated with the one or more terms, wherein each of the one or more named entities is associated with at least one category of a plurality of categories. The methods and systems may also include detecting a text field configured to receive text, the text field being associated with one of the plurality of categories, and inputting into the text field one of the one or more identified named entities based on the text field being associated with a same category as the one of the one or more named entities.

21 Claims, 11 Drawing Sheets

(51) Int. Cl.
*G06F 17/27* (2006.01)
*G06F 17/28* (2006.01)

(56) References Cited

U.S. PATENT DOCUMENTS

| | | | | |
|---|---|---|---|---|
| 6,263,308 | B1* | 7/2001 | Heckerman | G10L 15/063 704/231 |
| 6,311,157 | B1* | 10/2001 | Strong | G10L 15/1822 704/243 |
| 7,685,144 | B1 | 3/2010 | Katragadda | |
| 8,170,971 | B1* | 5/2012 | Wilson | G06N 3/02 455/457 |
| 8,260,615 | B1* | 9/2012 | Nakajima | G10L 15/183 704/2 |
| 8,352,245 | B1* | 1/2013 | Lloyd | G10L 15/183 704/9 |
| 8,630,860 | B1* | 1/2014 | Zhang | G10L 15/26 704/275 |
| 8,732,101 | B1* | 5/2014 | Wilson | G06N 3/063 706/15 |
| 8,732,605 | B1* | 5/2014 | Falaki | G06Q 30/02 715/780 |
| 8,793,122 | B2* | 7/2014 | White | G06F 3/0236 369/25.01 |
| 8,949,124 | B1* | 2/2015 | Wooters | G10L 15/065 704/235 |
| 9,179,061 | B1* | 11/2015 | Kraft | H04N 5/23222 |
| 9,286,910 | B1* | 3/2016 | Li | G10L 25/48 |
| 9,633,653 | B1* | 4/2017 | Porter | G10L 15/1815 |
| 2003/0154197 | A1* | 8/2003 | Millet | G06F 17/30595 |
| 2004/0203610 | A1* | 10/2004 | Deeds | H04M 1/72552 455/412.1 |
| 2004/0236726 | A1* | 11/2004 | Ewing | G06F 17/3048 |
| 2005/0096907 | A1* | 5/2005 | Bacchiani | G06K 9/6226 704/257 |
| 2005/0105712 | A1* | 5/2005 | Williams | G10L 13/027 379/265.02 |
| 2005/0198563 | A1* | 9/2005 | Kristjansson | G06F 17/243 715/224 |
| 2005/0204900 | A1* | 9/2005 | Burton | G06F 19/3487 84/600 |
| 2005/0267871 | A1* | 12/2005 | Marchisio | G06F 17/30672 |
| 2006/0004850 | A1* | 1/2006 | Chowdhury | G06F 17/30864 |
| 2006/0059434 | A1 | 3/2006 | Boss et al. | |
| 2006/0074659 | A1* | 4/2006 | Adams | G09B 5/04 704/251 |
| 2006/0074793 | A1* | 4/2006 | Hibbert | G06Q 40/00 705/38 |
| 2006/0143159 | A1* | 6/2006 | Chowdhury | G06F 17/30634 |
| 2006/0259385 | A1* | 11/2006 | Menken | G06Q 40/06 705/35 |
| 2007/0055514 | A1* | 3/2007 | Beattie | G10L 15/08 704/235 |
| 2007/0073533 | A1* | 3/2007 | Thione | G06F 17/279 704/9 |
| 2007/0130134 | A1 | 6/2007 | Ramsey et al. | |
| 2007/0174350 | A1* | 7/2007 | Pell | G06F 3/038 |
| 2007/0179776 | A1* | 8/2007 | Segond | G06F 17/2247 704/9 |
| 2007/0230787 | A1* | 10/2007 | Belitskaya | G06K 9/723 382/182 |
| 2008/0040099 | A1* | 2/2008 | Wu | G06F 17/275 704/9 |
| 2008/0069141 | A1* | 3/2008 | Bonaguro | G06Q 30/00 370/469 |
| 2008/0089665 | A1* | 4/2008 | Thambiratnam | G06F 17/30781 386/241 |
| 2008/0091412 | A1* | 4/2008 | Strope | G10L 15/26 704/10 |
| 2008/0109714 | A1* | 5/2008 | Kumar | G06F 17/227 715/234 |
| 2008/0228480 | A1* | 9/2008 | Maegawa | G10L 15/07 704/235 |
| 2009/0043573 | A1* | 2/2009 | Weinberg | H04L 63/302 704/223 |
| 2009/0055185 | A1* | 2/2009 | Nakade | G10L 15/30 704/257 |
| 2009/0063136 | A1* | 3/2009 | Kaida | G06F 17/2735 704/10 |
| 2009/0182702 | A1* | 7/2009 | Miller | G06F 17/30654 706/60 |
| 2009/0235280 | A1 | 9/2009 | Tannier et al. | |
| 2010/0033439 | A1* | 2/2010 | Kodimer | G06F 3/04886 345/173 |
| 2010/0169092 | A1* | 7/2010 | Backes | G06F 19/322 704/235 |
| 2010/0241645 | A1* | 9/2010 | Kandogan | G06F 17/30867 707/763 |
| 2011/0029853 | A1* | 2/2011 | Garrity | G06F 11/32 715/215 |
| 2011/0077943 | A1* | 3/2011 | Miki | G10L 15/183 704/250 |
| 2011/0099013 | A1* | 4/2011 | Melamed | G10L 15/19 704/255 |
| 2011/0119282 | A1* | 5/2011 | Gorman | G06F 17/30401 707/755 |
| 2011/0145744 | A1* | 6/2011 | Haynes | G06F 3/0481 715/766 |
| 2011/0166859 | A1* | 7/2011 | Suzuki | G10L 15/06 704/246 |
| 2011/0214056 | A1* | 9/2011 | Fleizach | G06F 1/1632 715/702 |
| 2011/0246944 | A1* | 10/2011 | Byrne | G06F 3/0489 715/835 |
| 2011/0288869 | A1* | 11/2011 | Menendez-Pidal | G10L 15/144 704/256.1 |
| 2012/0158751 | A1* | 6/2012 | Tseng | G06Q 30/02 707/751 |
| 2012/0163664 | A1* | 6/2012 | Zhu | G06F 3/0481 382/103 |
| 2012/0173222 | A1* | 7/2012 | Wang | G06F 17/273 704/2 |
| 2012/0253802 | A1* | 10/2012 | Heck | G10L 15/20 704/235 |
| 2012/0260209 | A1* | 10/2012 | Stibel | G06Q 30/018 715/780 |
| 2012/0297282 | A1* | 11/2012 | Shanafelt | G06F 17/243 715/220 |
| 2012/0297332 | A1* | 11/2012 | Changuion | G06F 3/0237 715/780 |
| 2012/0323557 | A1* | 12/2012 | Koll | G06F 17/276 704/8 |
| 2013/0046544 | A1* | 2/2013 | Kay | G06F 3/04883 704/275 |
| 2013/0073979 | A1* | 3/2013 | Shepherd | G06Q 50/01 715/744 |
| 2013/0073983 | A1* | 3/2013 | Rasmussen | G06Q 30/02 715/753 |
| 2013/0132366 | A1* | 5/2013 | Pieper | G06F 17/30867 707/710 |
| 2013/0218573 | A1* | 8/2013 | Cheng | G10L 15/22 704/275 |
| 2013/0238330 | A1* | 9/2013 | Casella dos Santos | G10L 15/183 704/235 |
| 2013/0253932 | A1* | 9/2013 | Ariu | G10L 15/22 704/246 |
| 2013/0254232 | A1* | 9/2013 | Reimer | G06F 17/30029 707/772 |
| 2013/0290302 | A1* | 10/2013 | Cowart | G06F 17/30554 707/722 |
| 2013/0342440 | A1* | 12/2013 | Yano | G06F 3/1454 345/156 |
| 2014/0019841 | A1* | 1/2014 | Basile | G06F 17/211 715/224 |

(56) References Cited

U.S. PATENT DOCUMENTS

| | | | |
|---|---|---|---|
| 2014/0025380 A1* | 1/2014 | Koch | G10L 15/1822 704/257 |
| 2014/0039877 A1* | 2/2014 | Guenigault | G06F 17/21 704/9 |
| 2014/0039887 A1* | 2/2014 | Dzik | G10L 15/26 704/235 |
| 2014/0090055 A1* | 3/2014 | Palumbo | H04L 63/145 726/22 |
| 2014/0108004 A1* | 4/2014 | Sternby | G06F 17/242 704/9 |
| 2014/0129218 A1* | 5/2014 | Liu | G10L 15/32 704/231 |
| 2014/0163954 A1* | 6/2014 | Joshi | G06F 17/276 704/9 |
| 2014/0244252 A1* | 8/2014 | Dines | G10L 15/183 704/235 |
| 2014/0278368 A1* | 9/2014 | Skory | G06F 17/22 704/9 |
| 2014/0282030 A1* | 9/2014 | Bhatnagar | G06F 3/0484 715/738 |
| 2014/0333632 A1* | 11/2014 | Kim | G06F 3/0486 345/467 |
| 2014/0337790 A1* | 11/2014 | Kim | G06F 3/0482 715/781 |
| 2015/0007110 A1* | 1/2015 | Chen | G06F 3/04842 715/835 |
| 2015/0039987 A1* | 2/2015 | Soulier | G06F 17/243 715/224 |
| 2015/0127565 A1* | 5/2015 | Chevalier | G06Q 10/00 705/319 |
| 2015/0186504 A1* | 7/2015 | Gorman | G06F 17/30684 707/752 |
| 2015/0205858 A1* | 7/2015 | Xie | G06Q 50/01 707/755 |
| 2015/0248391 A1* | 9/2015 | Watanabe | G06F 17/243 715/226 |
| 2015/0248392 A1* | 9/2015 | Watanabe | G06F 17/243 715/226 |
| 2015/0278922 A1* | 10/2015 | Isaacson | G06Q 30/0641 705/26.8 |
| 2017/0116392 A1* | 4/2017 | Casella dos Santos | G10L 15/183 |

FOREIGN PATENT DOCUMENTS

| | | |
|---|---|---|
| CN | 104063071 A | 9/2014 |
| EP | 1280068 A2 | 1/2003 |

OTHER PUBLICATIONS

Finkel, et al, "Incorporating Non-local Information into Information Extraction System by Gibbs Sampling," Stanford University, 2005, accessed Apr. 1, 2015 from <http://nlp.stanford.edu/~manning/papers/gibbscrf3.pdf>, 8 pages.

Finkel, Jenny Rose, "Named Entity Recognition and the Stanford NER Software," Stanford University, Mar. 9, 2007, accessed Apr. 1, 2015 from <http://nlp.stanford.edu/software/jenny-ner-2007.pdf>, 4 pages.

Nisar, et al., "Scaling Parallel I/O Performance through I/O Delegate and Caching System," Elecrical Engineering and Computer Science Department Northwestern University, Nov. 2008, accessed Apr. 1, 2015 from, <https://trac.mcs.anl.gov/projects/iofsl/export/643becef3424345d9d3891e1bb6878d603ac53e9/papers/a9-nisar.pdf>, 12 pages.

Nisar, et al., "Delegation-based I/O Mechanism for High Performance Computing Systems," Electrical Engineering and Computer Science Department Northwestern University, Parallel and Distributed Systems, IEEE Transactions on Parallel and Distributed Systems (TPDS), vol. 23, Issue 2, Jun. 9, 2011, accessed Apr. 1, 2015 from <http://www.ece.northwestern.edu/~choudhar/Publications/DelegationBasedIOMechanismHighPerformanceComputingSystems.pdf>, 9 pages.

Oct. 27, 2015 (WO) International Search Report and Written Opinion—App No. PCT/US2015/045198.

First Chinese Office Action issued in CN Application Serial No. 201580044005.7 dated Nov. 2, 2018.

* cited by examiner

CONCEPT IDENTIFICATION AND CAPTURE

FIELD

This application generally relates to computers and computer software. More specifically, aspects described herein relate to natural language processing software applications, and to a language parsing mechanism for concept identification and capture.

BACKGROUND

Natural Language Processing (NLP) and Natural Language Understanding (NLU) involve using computer processing to extract meaningful information from natural language inputs (e.g., spoken or text-based). More applications are using NLP and NLU to interact with users. Users face the problem of having to type text over and over again in multiple applications, which wastes time and effort.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

In view of an identified need for applications to provide users with the ability to input text in a less cumbersome manner, one or more aspects of the disclosure provide for a method that may include receiving, by a device, a first natural language input comprising one or more terms; and analyzing the first natural language input via a natural language processing engine to identify one or more named entities associated with the one or more terms, wherein each of the one or more named entities is associated with at least one category of a plurality of categories. The method may also include detecting a text field configured to receive text, the text field being associated with one of the plurality of categories; and inputting into the text field one of the one or more identified named entities based on the text field being associated with a same category as the one of the one or more named entities.

One or more aspects of the disclosure provide for a system that includes at least one processor; and at least one memory storing instructions that, when executed by the at least one processor, cause the system to perform one or more steps. The steps the system may perform may include receiving, by a device, a first natural language input comprising one or more terms; and analyzing the first natural language input via a natural language processing engine to identify one or more named entities associated with the one or more terms, wherein each of the one or more named entities is associated with at least one category of a plurality of categories. The steps may also include detecting a text field configured to receive text, the text field being associated with one of the plurality of categories; and inputting into the text field one of the one or more identified named entities based on the text field being associated with a same category as the one of the one or more named entities.

One or more aspects of the disclosure provide for one or more non-transitory computer-readable storage media having instructions stored thereon, that when executed by one or more processors, may cause the one or more processors to perform steps. The steps that the one or more processors perform may include receiving, by a device, a first natural language input comprising one or more terms; and analyzing the first natural language input via a natural language processing engine to identify one or more named entities associated with the one or more terms, wherein each of the one or more named entities is associated with at least one category of a plurality of categories. The steps may also include detecting a text field configured to receive text, the text field being associated with one of the plurality of categories; and inputting into the text field one of the one or more identified named entities based on the text field being associated with a same category as the one of the one or more named entities.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
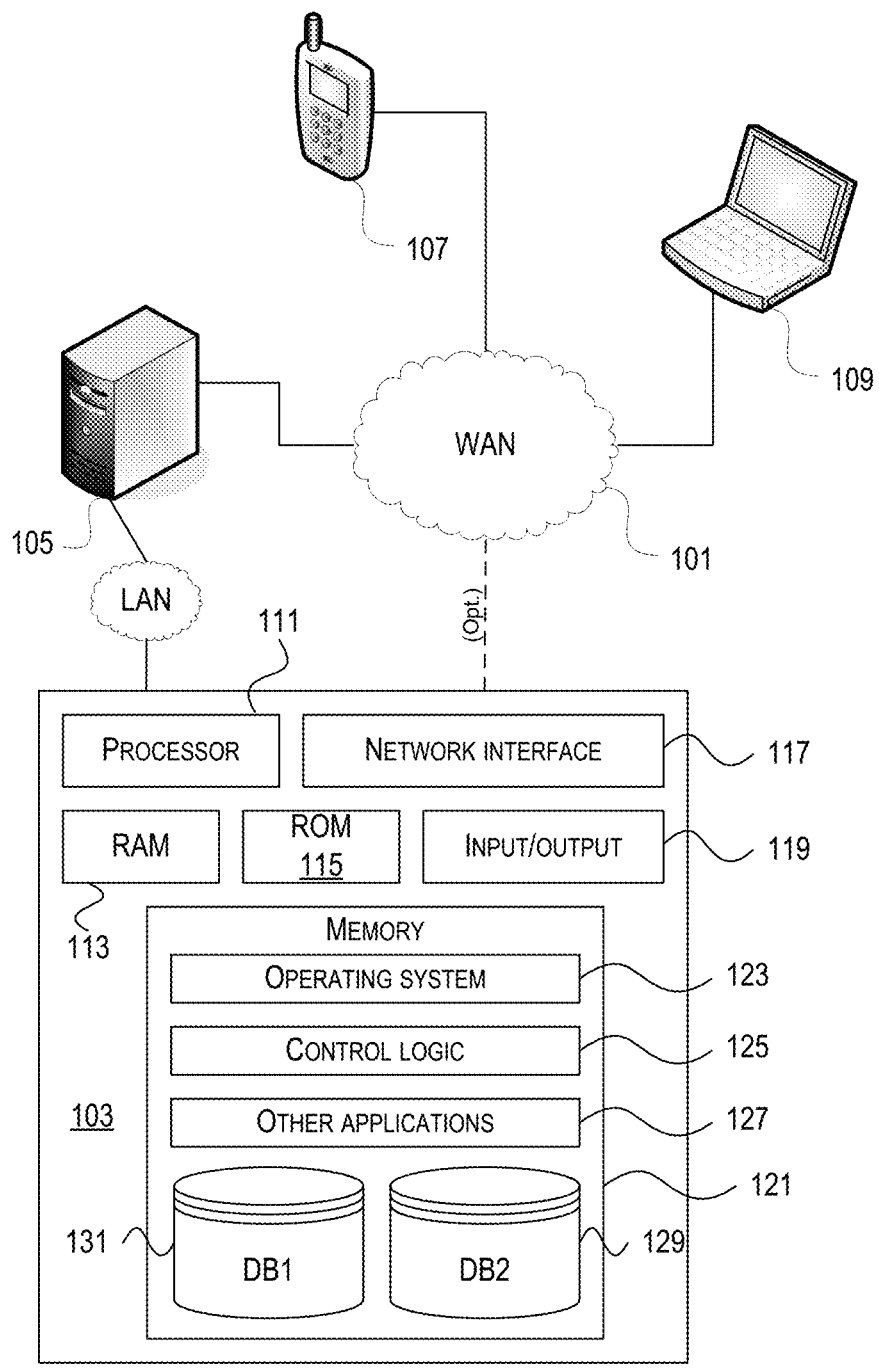
FIG. 1 depicts an illustrative diagram showing an example system in accordance with disclosed aspects.

FIG. 1 illustrates one example of a network architecture and data processing device that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

Devices 103, 105, 107, 109 may be automatic conversational systems having multiple computer-implemented dialogue components for conducting an automated dialogue process with a user. Devices 103, 105, 107, 109 may allow for a human-machine dialogue arrangement. According to some aspects, Devices 103, 105, 107, 109 may include multiple computer-implemented dialogue components, which may be configured to intercommunicate and use context to narrow down understanding, recognition, and/or reasoning errors. In some embodiments, Devices 103, 105, 107, 109 may detect and/or resolve anaphora based on linguistic cues, dialogue context, and/or general knowledge.

The term "network" as used herein and depicted in the drawings might refer not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with other aspects described herein. The control logic may also be referred to herein as the data server software 125. Functionality of the data server software may be operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

One or more aspects described herein are directed toward natural language understanding. According to disclosed aspects, a text sample may be a string of one or more words and/or terms. A substring may be one or more consecutive words of a string in which the order of the words is preserved. One or more words of a text sample may be hyponyms (relatively low-level concepts) that correspond to or are otherwise associated with one or more hypernyms (relatively high-level concepts). An ontology may define a semantic relationship between hyponyms and hypernyms. A hyponym may be a single word of a text sample or multiple consecutive words of a text sample. It will be appreciated that a hypernym may, in some instances, be a hyponym of another hypernym. For example, "Chicago" may be a hyponym of the hypernym "CITY," which may in turn be a hyponym of the hypernym "LOCATION." Thus, a hypernym may be a category or label attached to and/or otherwise associated with a hyponym. In another example of an ontology, a concert may be an event that may have a location and a date associated with it (e.g., a Jennifer Lopez concert at Madison Square Garden on July $26^{th}$ at 8:00 PM). Accordingly, the phrase "let's meet at the Jennifer Lopez concert" may mean to meet at Madison Square Garden on July $26^{th}$ at 8:00 PM. Thus, the concert (and its associated information like time, location, and date) may be a hypernym (or hypernyms) for the hyponyms of "DATE," "LOCATION," AND "TIME." Additional examples will be appreciated with the benefit of this disclosure. A simple hypernym may be a single hypernym, and a complex hypernym may be a concatenation of at least two simple hypernyms. A complex hypernym may include a delimiter (e.g., "&") that separates the concatenated simple hypernyms. A complex hypernym may thus also be referred to as a concatenated hypernym.

One or more aspects described herein are directed toward internal concept mapping. Internal concept mapping may be a mapping of key-value pairs or concepts that maps hyponyms to hypernyms. For example, internal concept mapping may map the names of cities (hyponyms) to the concept "CITY" (a hypernym). In this example, the name of the city may correspond to the key of the mapping, and the concept of "CITY" may correspond to the value of the mapping, (e.g., "New York"→"CITY"). Internal concept mapping may include functionality to search for a key-value pair or concept, add a new key-value pair or concept, and to perform other types of actions associated with mappings that will be appreciated to those skilled in the art.

According to some aspects, some concepts may be both hypernyms and hyponyms. For example, a "JFK New York" concept may be a hyponym of a "LOCATION" concept, which may be in turn a hyponym of an "AIRPORT CITY" concept.

Aspects of the present disclosure may utilize linguistic resources, such as a database that may define semantic relationships between concepts. For example, an external linguistic resource may thus be a lexical database such as, e.g., WordNet. Other examples of external linguistic resources include dictionaries capable of providing lexicographic data such as, e.g., Wikitionary. The grammar construction system may submit requests to the external linguistic resource, e.g., HyperText Transfer Protocol (HTTP) requests, and receive results in a response, e.g., an HTTP response.

Aspects of the present disclose may include a natural language processing engine computing device that implements a text-based parsing mechanism (e.g., a shallow parsing mechanism) of internal concept mapping that may analyze text strings comprising words and/or terms (e.g., natural language input) to determine or recognize concepts or key named entities, such as artists, dates, times, locations, products, etc. The parsing mechanism may be a sequence labeler, which may use hypernyms and/or hyponyms, as discussed herein. The parsing mechanism may be implemented via an application on, for example, devices 103, 105, 107, 109. The parsing mechanism may be implemented via a plugin. The parsing mechanism may be implemented in an operating system, such that the parsing mechanism may be implemented across many applications running on the operating system. Examples of applications in which disclosed aspects may be implemented may include text-messaging based applications (e.g., SMS, TMS), messing applications (e.g., instant messaging services such as WhatsApp, etc.), email applications, web browsers, word processing applications, and/or any text-based application.

According to some aspects, the parsing mechanism may be called/activated whenever text is input into a computing device, such as via a soft keyboard, via speech-based inputs, and the like. The parsing mechanism may also be activated in response to a user input, such as when a user presses (e.g., long-presses or short presses) or clicks (e.g., left or right clicks) on text. For example, after a user long-presses on text displayed on a mobile device, various options may be displayed to the user, such as copy, select all, cut, etc. Thus, according to some aspects, an "analyze concepts" option may be displayed to a user, such that a user can select the "analyze concepts" option to initiate the parsing mechanism. In one example, a user may select/highlight text to be analyzed by the parsing mechanism before selecting the "analyze concepts" option. In another example, a user might not need to select/highlight text. In such cases, the user may, for example, long-press the text (without highlighting any text), and the "analyze concepts" option may be displayed. After the user selects the "analyze concepts" option, any displayed text may be analyzed. For example, in a text message conversation, a user may long press in the proximity of a received message and subsequently select an "analyze concepts" option. In such cases, the received message may be analyzed. In other cases, all of the displayed text (e.g., the text that comprises the received message along with any other displayed text) may be analyzed. According to some aspects, the parsing mechanism may operate automatically and/or continuously, such that any displayed or received text may be analyzed by a device without receiving a user input. In such cases, the user may select an option to "automatically" or "continuously" analyze text on the device or within an application. For example, an SMS message may be intercepted and analyzed for concepts automatically. Details of the disclosed parsing mechanism are described below in more detail.

Figure 2:
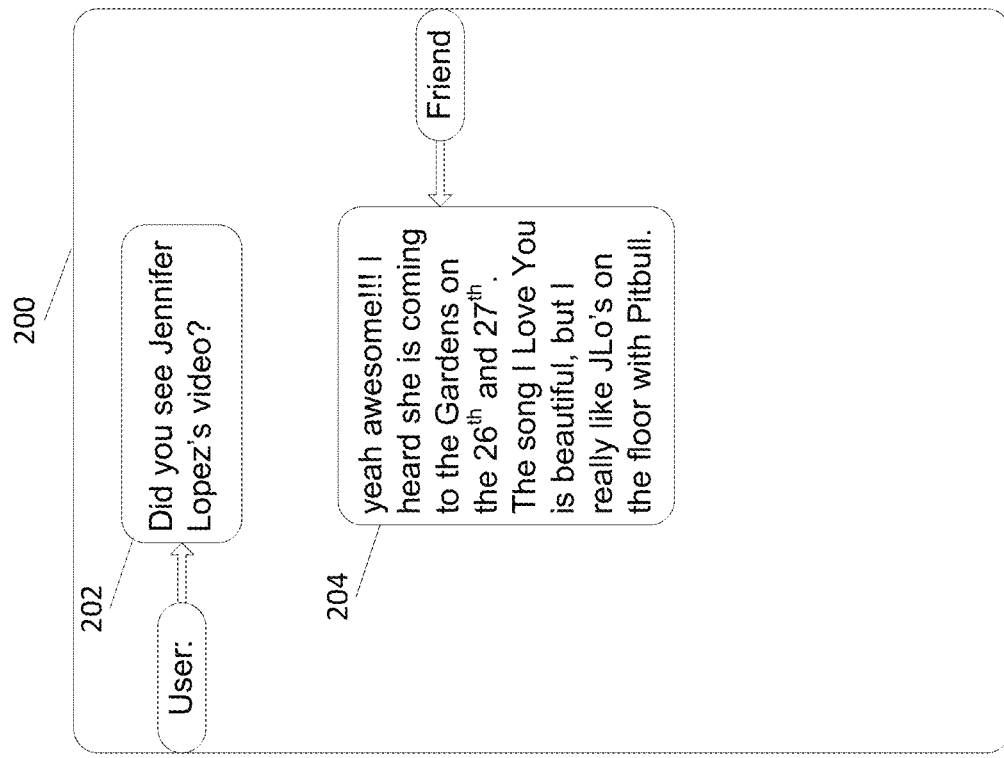
FIG. 2 depicts an illustrative diagram showing an example text message application in accordance with one or more disclosed aspects.

FIG. 2 illustrates a display 201 showing a text message conversation 200 (e.g., running via a text messaging application) between a user and the user's friend in accordance with disclosed aspects. In text message conversation 200, a user might type a text message 202 stating "Did you see Jennifer Lopez's video?" The user may receive a text message 204 from the user's friend that might state "yeah awesome!!! I heard she is coming to the Gardens on the 26$^{th}$ and 27$^{th}$. The song I Love You is beautiful, but I really like JLo's on the floor with pitbull."

According to some aspects, the user may wish to perform one or more actions with the information the user has just received from the user's friend. For example, the user may wish to search (e.g., in a music application, on the internet via a browser application, etc.) for the songs "I Love You" or "On the Floor," or for the artists "Jennifer Lopez" or "Pitbull." The user may also wish to search for concert/event tickets that may be associated with these songs or artists. For example, the user may wish to search for these artists using a browser application via, for example, a ticket website. The user may wish further narrow down any search results using, for example, the dates of 26$^{th}$ and the 27$^{th}$ or the venue of the Gardens, all of which were included in the text message 204. In one or more of these situations, the user may need to type the artist's name, a song's title, a date, or a venue into a search field. The user may need to continuously switch between the text message application and the ticket website (e.g., running via a browser application or ticket broker application) to make sure the information entered into the ticket website matches (e.g., to determine the correct spelling) the information in the text message. However, according to aspects of the present disclosure, a user may use a parsing mechanism to analyze the text to identify concepts/named entities in the text of the text conversation 200 that may be used in the same application (e.g., the text message application) or another application (e.g., the web browser application). According to some aspects, disclosed features may be used with applications other than text messaging applications, such as email applications, web browsers, word processing applications, and/or any text-based application.

Figure 3:
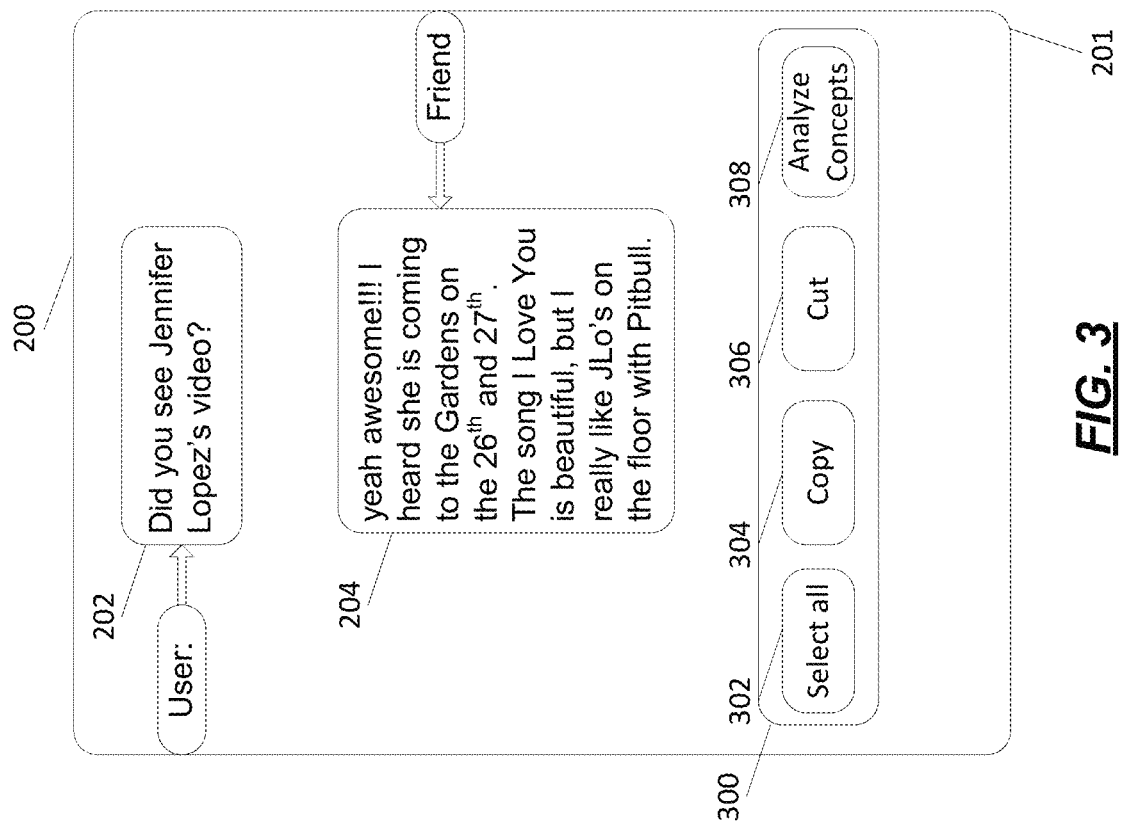
FIG. 3 depicts an illustrative diagram showing an example browser application in accordance with one or more disclosed aspects.

FIG. 3 illustrates the display 201 showing the text message conversation 200 between a user and the user's friend in accordance with disclosed aspects. As shown in FIG. 3, display 201 may include an operations box 300, which may include one or more operation options for selection, such as select all 302, copy 304, cut 306, and analyze concepts 308. According to some aspects, operations box 300 may be displayed on a device (e.g., devices 103, 105, 107, 109) in response to and/or after receiving a user action. Such user action may include, for example, a long or short press, right click, tapping a display, tapping a button (e.g., on a soft keyboard or other input device), or other input. According to some aspects, operations box 300 may be automatically displayed on the device (e.g., without user action).

According to some aspects, a user may select/highlight text to be analyzed by a natural language processing engine computing device implementing the parsing mechanism. For example, the user may highlight "I heard she is coming to the Gardens on the 26$^{th}$" from text message 204. After highlighting the text (e.g., immediately after), operations box 300 may be displayed. The user may then select the analyze concepts operation 308, which may then initiate the disclosed parsing mechanism, and the selected text may then be analyzed to identify concepts in the selected text according to disclosed features herein (to be discussed in more detail below).

In some situations, the highlighted text may be automatically analyzed for concepts by the parsing mechanism. For example, the user may need to only select/highlight text (e.g., with no additional input) for the parsing mechanism to parse and identify concepts in the selected/highlighted text.

According to some aspects, text other than the analyzed (e.g., highlighted) text may be used by the parsing mechanism in the process of identifying named entities/concepts from the highlighted text. For example, information from text message 202, such as "Jennifer Lopez" may be used by the parsing mechanism to identify the "she" in the highlighted text of "I heard she is coming to the Gardens on the 26$^{th}$" from text message 204. This may be an example of anaphora resolution. According to some embodiments, disclosed aspects may detect and/or resolve anaphora based on linguistic cues, dialogue context, and/or general knowledge.

Figure 4:
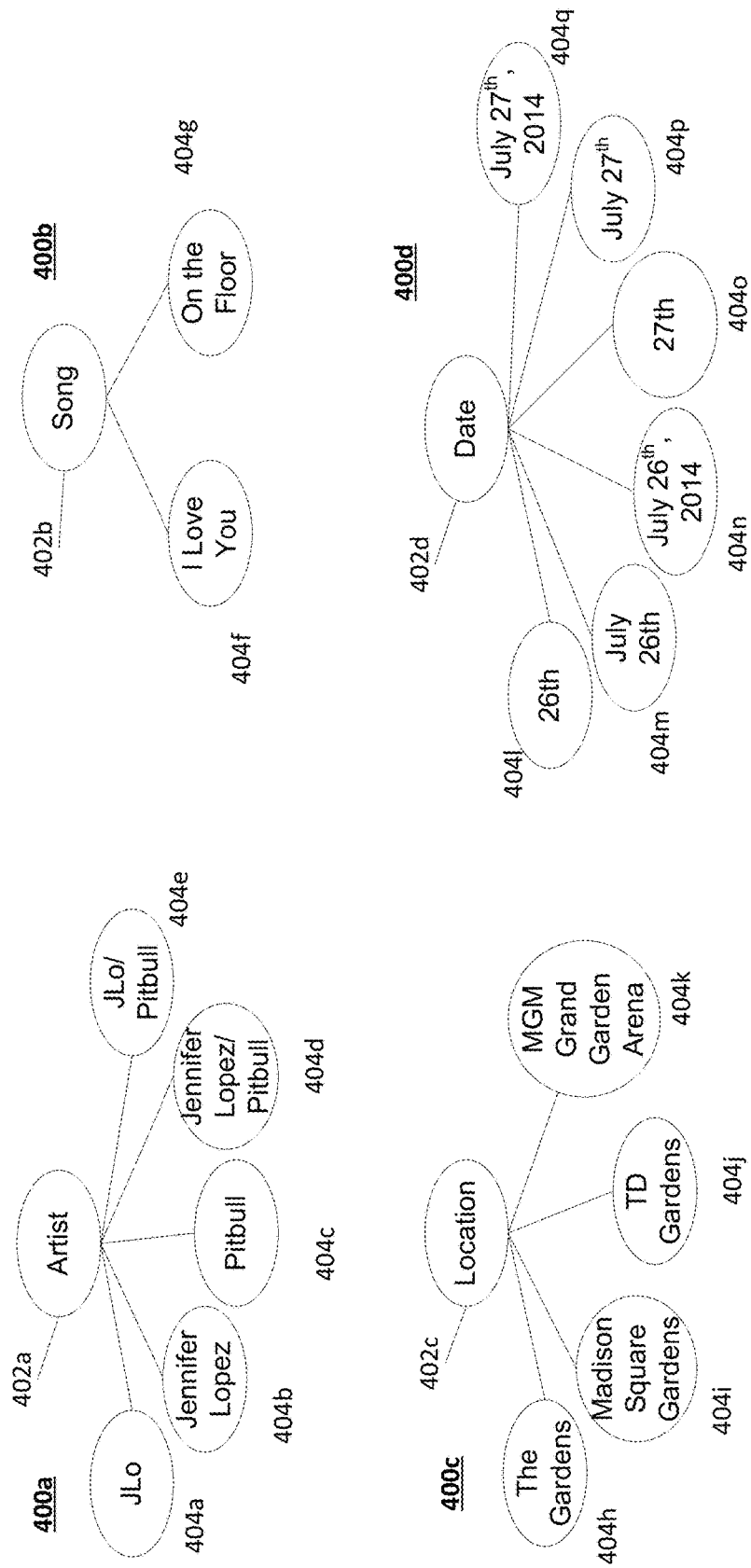
FIG. 4 depicts illustrative diagrams showing example graphs illustrating multiple semantic relationships in accordance with one or more disclosed aspects.

FIG. 4 illustrates examples of graphs that illustrate multiple semantic relationships 400$a$-$d$ between relatively low-level concepts 404$a$-$q$, and relatively high-level concepts 402$a$-$d$. Accordingly, the concepts 404$a$-$q$ may be hyponyms of the concepts 402$a$-$d$. As shown, the concepts 404$a$-$e$ may be hyponyms of the concept 402$a$, concepts 404$f$-$g$ may be hyponyms of the concept 402$b$, concepts 404$h$-$k$ may be hyponyms of the concept 402$c$, and concepts 404$l$-$q$ may be hyponyms of the concept 402$d$. The disclosed parsing mechanism may analyze/parse the text (e.g., any text from text message conversation 200) to determine the semantic relationships 400$a$-$d$. For example, a user may long press in proximity to text message 204, and the parsing mechanism may analyze the text proximate to the location of the press to determine the relationships 402$a$-$d$. According to some aspects, high-level concepts, such as concepts 402$a$-$d$ may be categories or labels for low-level concepts such as concepts 404$a$-$q$. These categories may be used to group similar concepts and/or concepts having similar characters and/or associations. For example, the concepts 404$a$-$e$ may each identify and/or be associated with one or more artists. According to some aspects, a concept may comprise one or more other identified concepts, such as concept 404$d$. For example, concept 404$d$ may be identified/generated based on analyzing the words in the text message and/or it may be generated based on a combination of concepts 404$b$ and 404$c$.

According to some aspects, an identified concept may comprise a surface form/format and/or a canonical form/format. For example, the parsing mechanism may perform canonicalization for some concepts such as concepts associated with, for example, the categories of "date" or "time." It is noted that the parsing mechanism may perform canonicalization for concepts being associated with other categories. A concept in canonical form may include text that might not be present or displayed in the analyzed text, and may include information and/or additional text that may be inferred, gathered, and/or determined based on the associated context, grammar, historical data, metadata, and/or other information. For example, the text message 204 states " . . . the 26$^{th}$ . . . " Examples of concepts in canonical form for the named entity of "26$^{th}$" may include the concept 404$m$ ("July 26$^{th}$") or the concept 404$n$ ("Jul. 26, 2014"). Thus, in this example, the parsing mechanism may use other information, such as the current or subsequent month and/or year, in determining the concepts 404$m$ and 404$n$. An example of a concept in surface form for the named entity of "26$^{th}$" may be the concept 404$l$ ("26$^{th}$"). The parsing mechanism may perform canonicalization for concepts that may be in an abbreviated form, acronym form, slang form, and/or otherwise represent other words and terms. For example, the text message 204 states " . . . I really like JLo's . . . " Examples of concepts in canonical form for the named entity of "JLo"

may include the concept 404*b* ("Jennifer Lopez"). According to some aspects, canonicalization may be grammar based and/or statistical based.

Figure 5:
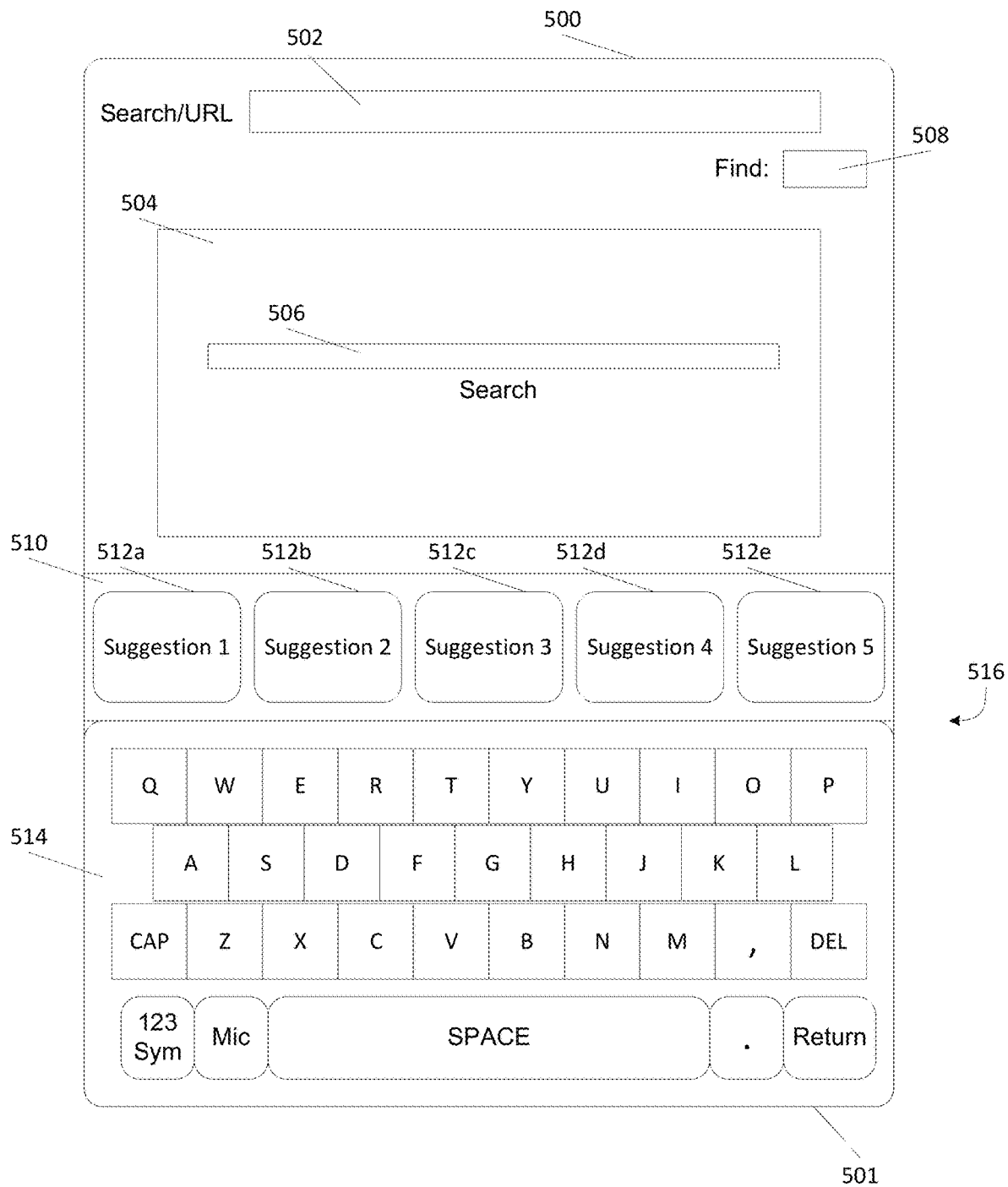
FIG. 5 depicts an illustrative diagram showing an example an example browser application in accordance with one or more disclosed aspects.

FIG. 5 illustrates an example diagram of a display 501 displaying a browser application 500 that may be implemented on a device such as devices 103, 105, 107, and/or 109 in accordance with one or more disclosed aspects. The browser 500 may include a search/URL field 502, which may able to receive text and search the internet or retrieve/go to a website based on the received text. Browser 500 may include a webpage 504, which may include a field 506, which may be able to receive text that may be used by the browser 500 to conduct a search (e.g., a concert ticket search). Browser 500 may also include a find box/field 508, which may be able to receive text, and conduct a find operation based on the received text. Display 501 may include an input portion 516, which may include a soft keyboard 514 and a suggestion box 510. Input portion 516 may include other types of input devices/components. Soft keyboard 514 may be an on-screen displayed keyboard used to input characters into a device and/or application (e.g., application 500). Suggestion box 510 may include one or more suggestions 512*a-e*, and may be input into an application (e.g., application 500).

According to some aspects, suggestions 512*a-e* may comprise one or more concepts, such as one or more of the concepts 404*a-q* identified from the text message conversation 200. For example, after a user has initiated/activated the disclosed parsing mechanism to identify concepts from the text message conversation 200, the identified concepts may be stored in a cache, clipboard, and/or via cloud storage. The cache may be located on one or more devices (e.g., located locally and/or remotely) and/or be associated with an application, input portion 516, or soft keyboard 514. For example, whenever the soft keyboard 514 is displayed (e.g., such as in response to a text cursor or focus in a text box or field capable of receiving text), the cached identified concepts may be retrieved from the cache and displayed as, e.g., one or more of the suggestions 512*a-e* in the suggestion box 510. The cache may be configurable and/or aged. According to some aspects, more than one device may access a concept cache (or other storage device/component). For example, the cache may be located at a centralized and/or remote location, such as on a server or other computing device which may be located and/or controlled by an entity, such as a business or enterprise entity. According to some aspects, more than one devices may access the cache. For example, a user's mobile device and the user's friend's mobile device may each generate respective concepts, store/transmit their respective concepts to a common/global cache, and access/retrieve concepts from the common cache. In another example, a plurality of the user's devices may access a single cache. For example, the user's cell phone and computer may each generate respective concepts, store/transmit their respective concepts to a common cache, and access/retrieve concepts from the common cache. According to some aspects, a concept may be identified in the suggestion box with a small icon and/or an abbreviated version of the concept. For example, the concept "Jennifer Lopez" may be identified as the suggestion "lopez" in suggestion box 510. According to some aspects, suggestions 512*a-e* may also include other suggestions, such as spelling suggestions, suggestions based on user-specific dictionaries and/or user-specific N-Gram biases, and the like.

Figure 6:
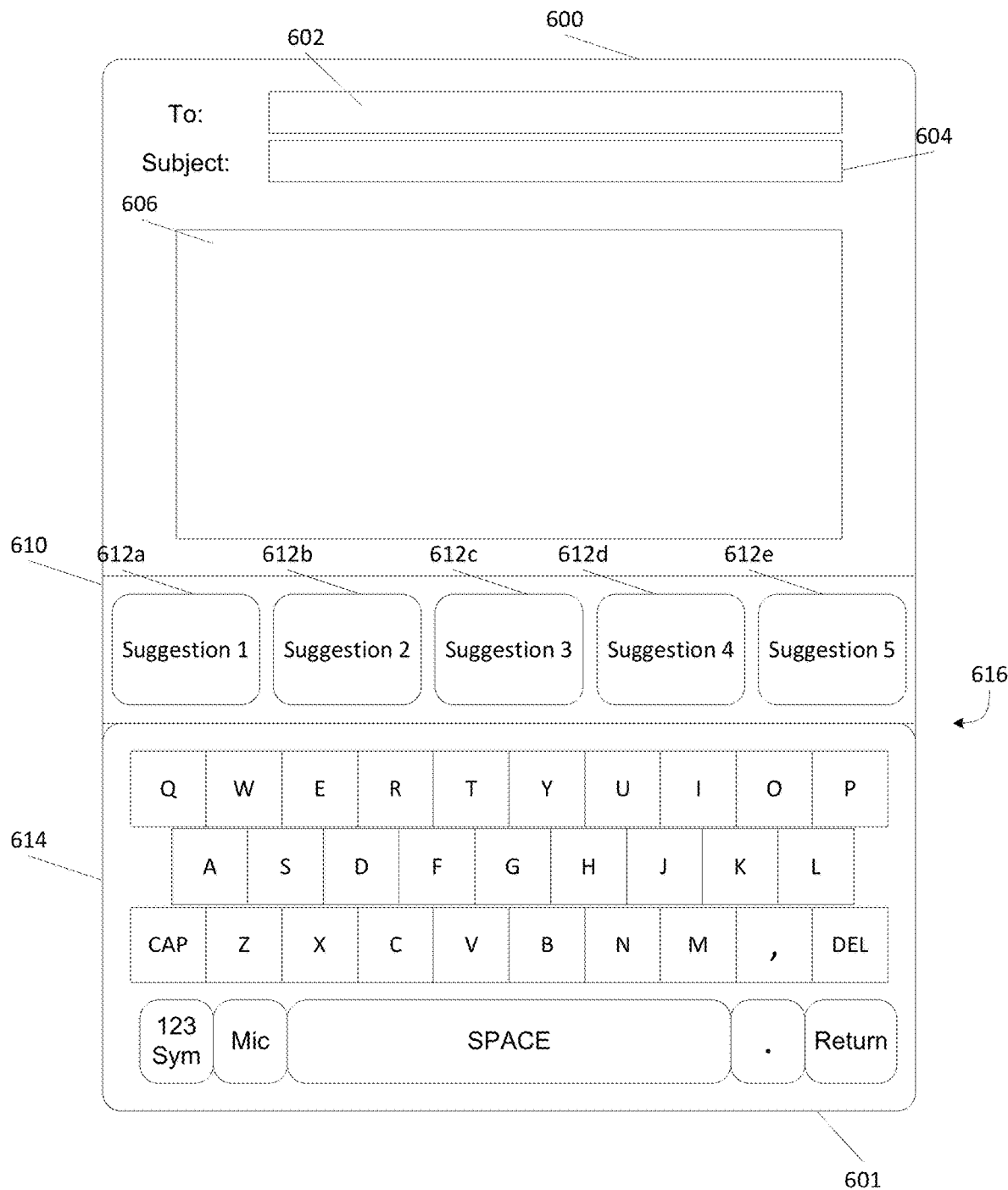
FIG. 6 depicts an illustrative diagram showing an example an example email application in accordance with one or more disclosed aspects.

FIG. 6 illustrates an example diagram of a display 601 displaying an e-mail application 600 that may be implemented on a device such as devices 103, 105, 107, and/or 109 in accordance with one or more disclosed aspects. The e-mail application 600 may include a "To:" field 602, a "Subject" field 604, and a field 606 used to type the body of the email. The display 601 may include an input portion 616, which may include a soft keyboard 614 and a suggestion box 610. Input portion 616 may include other types of input devices/components. Soft keyboard 614 may be an on-screen displayed keyboard used to input characters into a device and/or application (e.g., application 600). Suggestion box 610 may include one or more suggestions 612*a-e*, which may be similar to suggestions 512*a-e*, may be derived from one or more concepts, such as concepts 404*a-q*, and may be input into an application (e.g., application 600).

Figure 7:
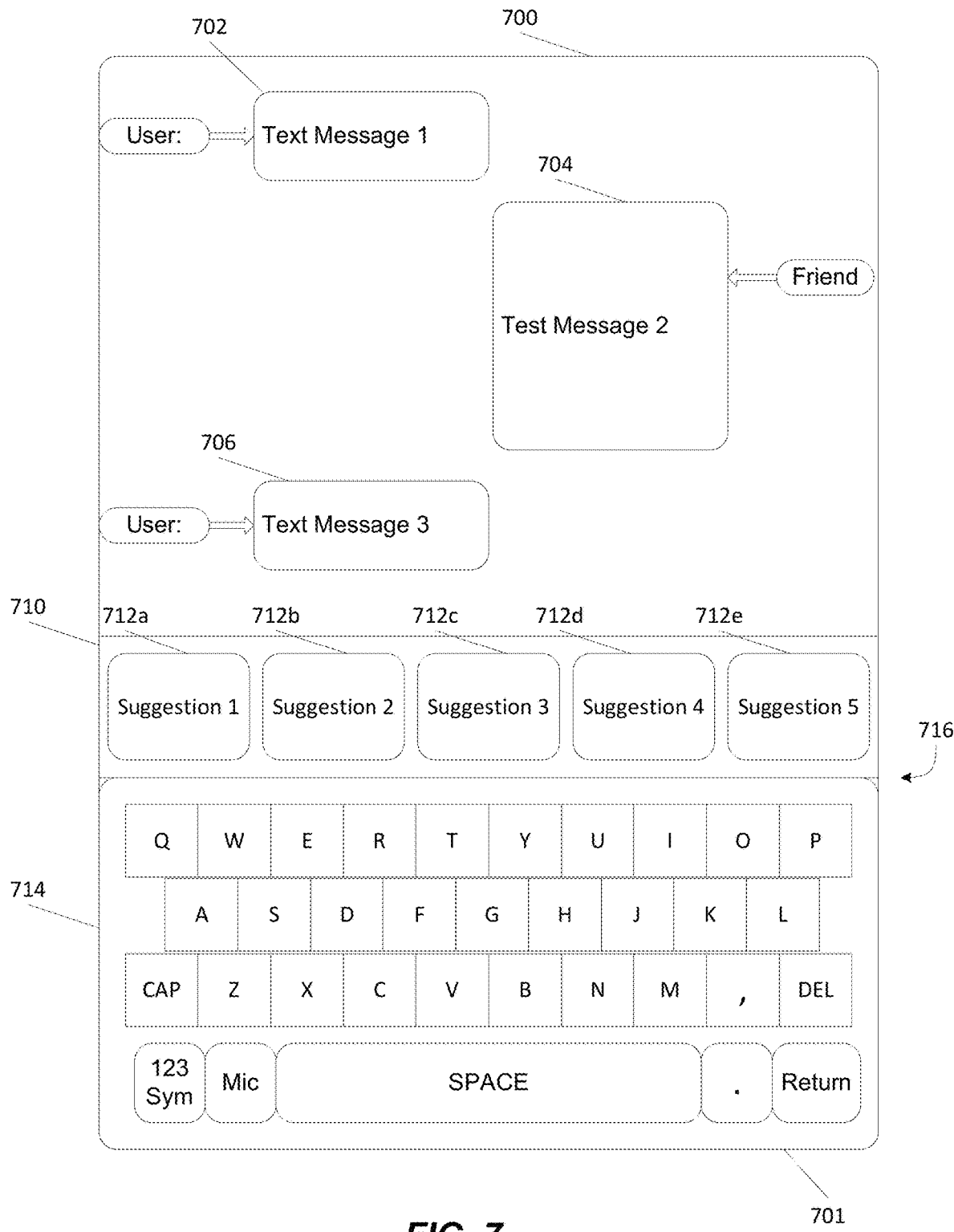
FIG. 7 depicts an illustrative diagram showing an example text message application in accordance with one or more disclosed aspects.

FIG. 7 illustrates an example diagram of a display 701 displaying a text message application 700 that may be implemented on a device such as devices 103, 105, 107, and/or 109 in accordance with one or more disclosed aspects. The text message application 700 may include "From:" or "Sender:" fields 702 and 706 (e.g., which may identify text or language a user has sent in a text message), and a "To:" or "Recipient:" field 704 (e.g., which may identify text or language a recipient or someone other than the user has sent in a text message). Display 701 may include an input portion 716, which may include a soft keyboard 714 and a suggestion box 710. Input portion 716 may include other types of input devices/components. Soft keyboard 714 may be an on-screen displayed keyboard used to input characters into a device and/or application (e.g., application 700). Suggestion box 710 may include one or more suggestions 712*a-e*, which may be similar to suggestions 512*a-e*, may be derived from one or more concepts, such as concepts 404*a-q*, and may be input into an application (e.g., application 700).

Figure 8:
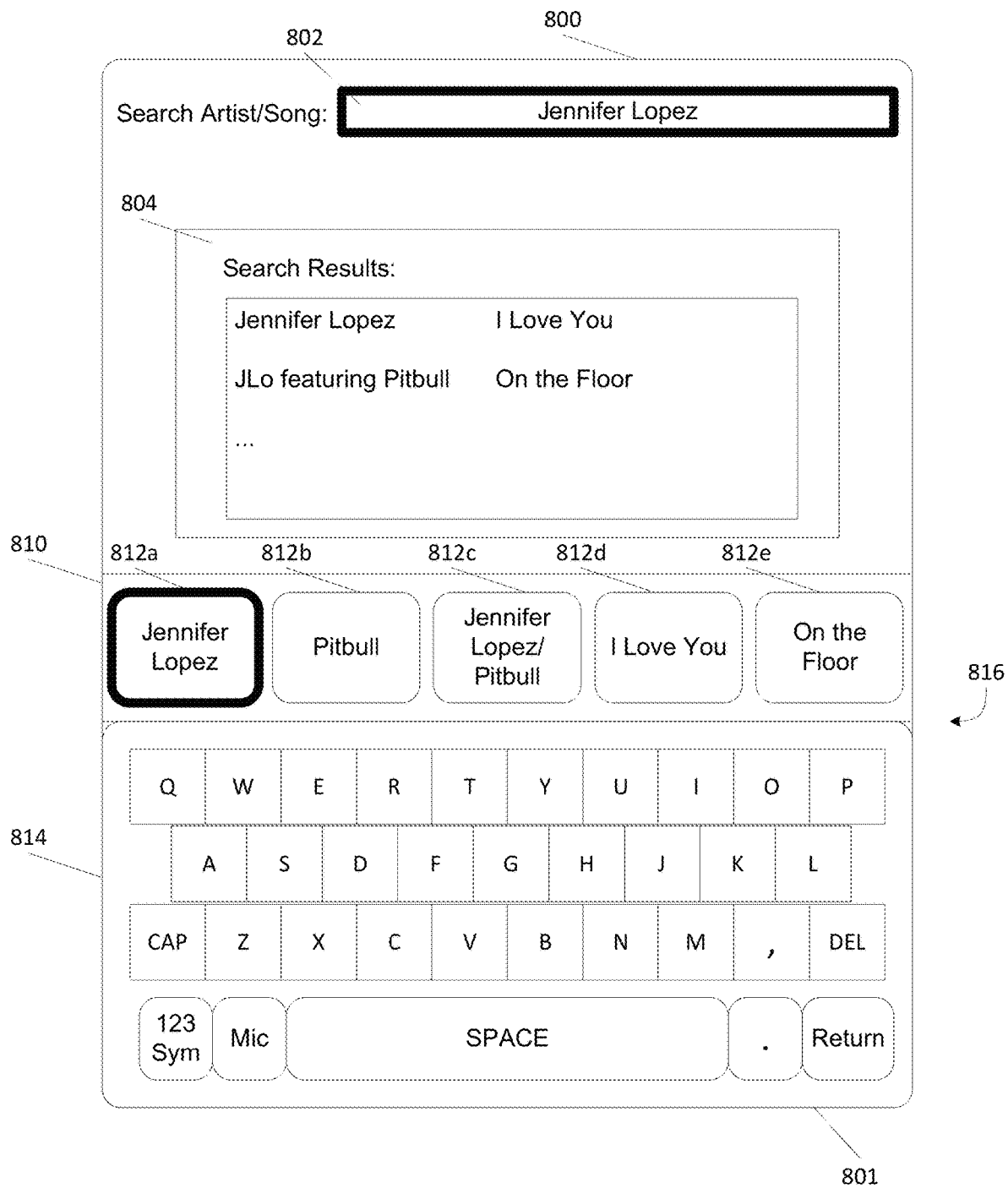
FIG. 8 depicts an illustrative diagram showing an example an example media player application in accordance with one or more disclosed aspects.

FIG. 8 illustrates an example diagram of a display 801 displaying a media player application 800 that may be implemented on a device such as devices 103, 105, 107, and/or 109 in accordance with disclosed aspects. Application 800 may include a search field 802, which may be used by a user to search for an artist and/or song in a library of artists or songs and/or on/via the internet. Application 800 may include a results section that may include the results of a search. Such results may include an artist's name, a song title name, and the like. Display 801 may also include an input portion 816, which may be similar to input portions 516, 616, and 716. Input portion 816 may include a soft keyboard 814 and a suggestion box 810. Input portion 816 may include other types of input devices/components. Suggestion box 810 may include one or more suggestions 812*a*-812*e*. Each suggestion 812*a*-812*e* may comprise one or more concepts, such as one or more of the concepts 404*a-q* identified from the text message conversation 200. As shown, suggestion 812*a* may correspond to the concept "Jennifer Lopez," suggestion 812*b* may correspond to the concept "Pitbull," suggestion 812*c* may correspond to the concept "Jennifer Lopez/Pitbull," suggestion 812*d* may correspond to the concept "I Love You," and suggestion 812*e* may correspond to the concept "On the Floor." Concepts corresponding to suggestions 812*a-e* may be stored in a cache that may be located on the device and/or associated with the media player application 800. For example, the device may include a cache that may be used to store concepts for the media player application 800, and after the media player application 800 is opened, the corresponding cache may be accessed for retrieval of one or more concepts stored in that cache. According to some aspects, the device may include a cache (e.g., a general or global cache) that may store one or more concepts that may be used by more than one application.

According to some embodiments, the suggestion box 810 may be displayed in response to detecting a text field, such as field 802. For example, after a user has analyzed concepts (or concepts were automatically analyzed, such as without user action) in text message conversation 200 using the parsing mechanism, the user may open a different application, such as media player 800. The user may then move a cursor or focus to search box 802 (e.g., by touch, mouse, etc.), such as shown in FIG. 8 by the darkened perimeter of the search box 802, so the user can search for a song or artist. After the user has moved the focus to search box 802, the suggestion box 810 may be automatically displayed. According to some aspects, the suggestion box 810 may be displayed in response to a user action, such as a long-press, short-press, right click, and/or a subsequent selection of an option to display suggestion box 810.

According to some embodiments, concepts may be ranked based on the type of application from which the concepts were retrieved (e.g., text message conversation 200) and/or based on the type of application to which the concepts are being used or input (e.g., media player 800). According to some aspects, this ranking may be based on a correlation between the concepts and the type of application. For example, because the media player 800 may be used to play media (e.g., songs), then media related concepts (e.g., artists, songs, etc.) may be ranked higher than non-media related concepts. The higher ranked media related concept(s) may then be shown as suggestions in suggestion box 810 when used in application 800. According to some embodiments, the ranking may be based on an entity that sent (or otherwise associated with) received or analyzed text. For example, if a co-worker (e.g., identified in the device or address book as a co-worker, etc.) sent a message, then concepts identified in or associated with that message may be ranked according to work related topics. If a friend (e.g., someone the user has many phone calls from and/or text messages with, etc.) sent a message, then concepts identified in that message may be ranked according to, for example, leisure related topics (e.g., non-work related topics). According to some embodiments, information derived from past communications and/or conversations may be used to rank concepts. According to some embodiments, user information may be used to rank concepts, such as a location of a user, previous locations of a user, websites the user may have visited, user demographic information, games on a user's device, and the like. According to some embodiments, concepts may be ranked based on their popularity and/or usage. For example, concepts generated from a plurality of users and/or devices may indicate that some concepts may be more commonly generated, selected, and/or inserted than other concepts. Accordingly, the more commonly generated concepts may be ranked higher than less commonly generated, selected, and/or inserted concepts. In a similar example, the popularity may be based on the popularity of concepts of an individual user. For example, the user may more commonly generate, select, and/or insert some concepts more than other concepts.

According to some embodiments, concepts may be ranked based on text that may be displayed and/or input into an application using, for example, natural language understanding and/or grammar. For example, in text message 204, the user's friend may state "I heard she is coming to the Gardens . . . " The user may analyze this text with the parsing mechanism. The user may then decide to use identified concepts to type a response. For example, the user may type "I would like to go see" and, based on the current conversation and analyzed concepts, the concept of "Jennifer Lopez" may be a highest ranked or a high ranked concept/ suggestion. Thus, the user may use this suggestion to insert "Jennifer Lopez" after his initial input. Accordingly, the user may input the complete phrase "I would like to go see Jennifer Lopez." According to some aspects, a suggestion (e.g., a high or highest ranked suggestion) may automatically be input upon detection of input text. For example, the concept "Jennifer Lopez" might be automatically inserted/ input after the user types/inputs "I would like to go see" in the text message application.

After the suggestion box 810 is displayed, the user may then select one or more of the suggestions 812*a-e* displayed in the suggestion box 810. For example, the user may select suggestion 812*a* to input "Jennifer Lopez" into text box 802, such as shown in FIG. 8. The user may then search based on this selection, which may produce the results shown in the results section 804. The use may then select additional suggestions to input in the same or additional text boxes. Thus, the user may append the text of an initially inputted suggestion with an input of a subsequent suggestion. According to some aspects, after a user has selected/input a suggestion into a text box, the suggestions displayed in the suggestion box 810 may be re-ranked. For example, the suggestions may be re-ranked with or without the selected suggestion. In another example, the suggestions may be re-ranked based on grammar and/or other knowledge.

According to some aspects, a concept may be input into a text box automatically, such as without user action/input. For example, after analyzing the text message conversation 200 to identify concepts, the user may open application 800 to search for one or more of the identified concepts. In such an example, one of the identified concepts may automatically be input into the search box 802. In some situations, a highest ranked concept may be automatically input into the search box. In some situations, the concept (e.g., an associated category or hyponym) may correspond to a type, category, or classification of the text box (e.g., text box 802 being a search box for an artist or song, and an automatically input concept may be an artist or song).

Figure 9A:
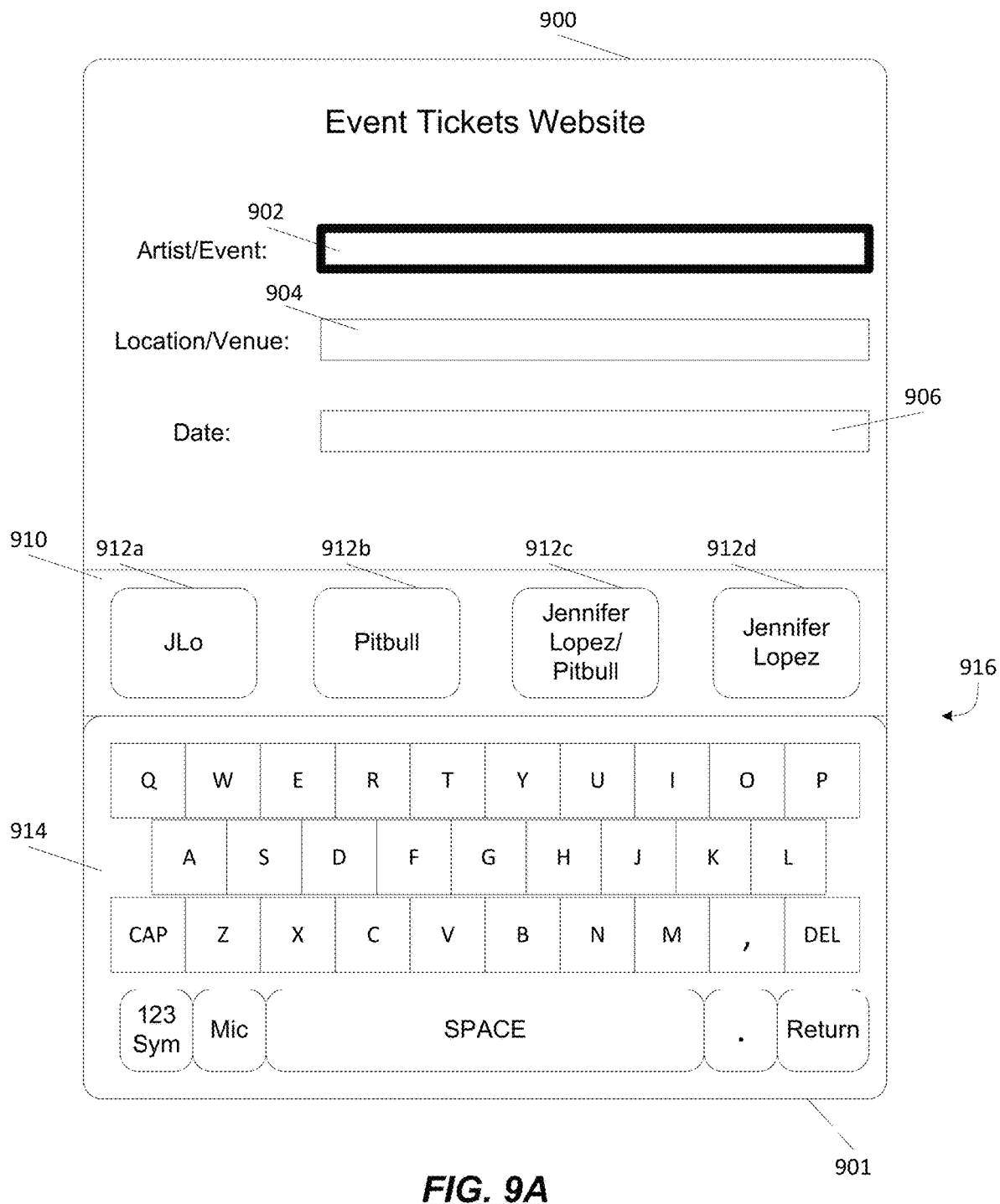
FIG. 9A depicts an illustrative diagram showing an example an example browser application in accordance with one or more disclosed aspects.

FIG. 9A illustrates an example diagram of a display 901 displaying a browser application 900 showing a webpage 908 that may be implemented on a device such as devices 103, 105, 107, and/or 109 in accordance with disclosed aspects. Webpage 908 may be part of a website used to sell and/or buy tickets to events, such as plays, concerts, sporting events, and the like. Webpage 908 may include a search field 902, which may be used by a user to search for an artist associated with an event on the website. Webpage 908 may include a search field 904, which may be used by a user to search for a venue or location associated with an event on the website. Webpage 908 may include a search field 906, which may be used by a user to search for a date or range of dates associated with an event on the website. Display 901 may also include an input portion 916, which may be similar to input portions 516, 616, 716, and 816. Input portion 916 may include a soft keyboard 914 and a suggestion box 910. Input portion 916 may include other types of input devices/components. Suggestion box 910 may include one or more suggestions comprising one or more concepts, such as one or more of the concepts 404*a-q* identified from the text message conversation 200.

According to some aspects, concepts associated with a subject matter or type of a text field may be displayed in a suggestion box, such as suggestion box 910. For example, as shown in FIG. 9A, the focus/cursor may be on the text field 902 (e.g., text field 902 is shown as having a darkened perimeter), which may correspond to an artist associated with an event listed on the website. Thus, when the focus/cursor is on text field 902, the suggestions shown in suggestion box 910 may correspond to identified concepts corresponding to an artist, because the text field 902 is used to search for events based on an artist. According, as shown in FIG. 9A, the suggestions may include concepts having an associated category of Artist (e.g., 402a in FIG. 4). For example, suggestion 912a may correspond to the concept "JLo," suggestion 912b may correspond to the concept "Pitbull," suggestion 912c may correspond to the concept "Jennifer Lopez/Pitbull," and suggestion 912d may correspond to the concept "Jennifer Lopez." Thus, according to some aspects, the concepts that may correspond, match, or otherwise be associated with the type of text field that is currently in focus and/or currently being used to input text may be ranked higher than other concepts. According to some aspects, these higher ranked concepts may be displayed as suggestions in suggestion box 910, such as after that corresponding text field is in focus.

Figure 9B:
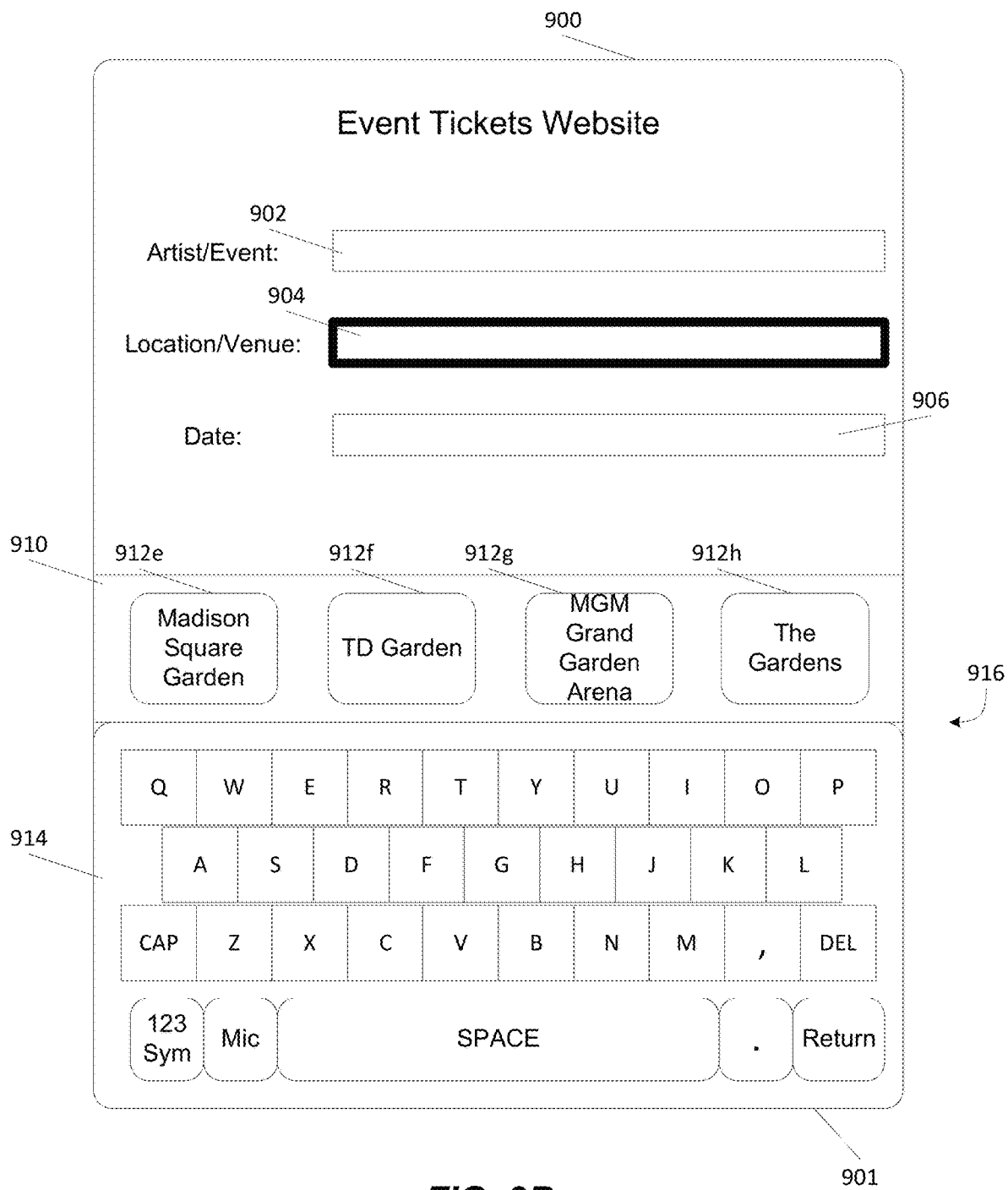
FIG. 9B depicts an illustrative diagram showing an example an example browser application in accordance with one or more disclosed aspects.

FIG. 9B illustrates an example diagram of the display 901 displaying the browser application 900 showing the webpage 908 that may be implemented on a device such as devices 103, 105, 107, and/or 109 in accordance with disclosed aspects. As stated above for FIG. 9A, concepts associated with a subject matter or type of a text field may be displayed in a suggestion box, such as suggestion box 910. For example, as shown in FIG. 9B, the focus/cursor may be on the text field 904, which may correspond to a venue or location associated with an event on the website. Thus, when the focus/cursor is on text field 904 (e.g., text field 904 is shown as having a darkened perimeter), the suggestions shown in suggestion box 910 may correspond to identified concepts corresponding to a venue or location, because the text field 904 is used to search for events based on venue or location. According, as shown in FIG. 9B, the suggestions may include concepts having an associated category of "Location" (e.g., 402c in FIG. 4). For example, suggestion 912e may correspond to the concept "Madison Square Garden," suggestion 912f may correspond to the concept "TD Garden," suggestion 912g may correspond to the concept "MGM Grand Garden Arena," and suggestion 912h may correspond to the concept "The Gardens." According to some aspects, a user of webpage 908 may be located in proximity to New York, and thus the suggestion 912e of "Madison Square Garden" may be ranked higher than other concepts, and may be listed first in the suggestion box 910. The next closes venue ("TD Garden") may be ranked second, and may be listed second.

Figure 9C:
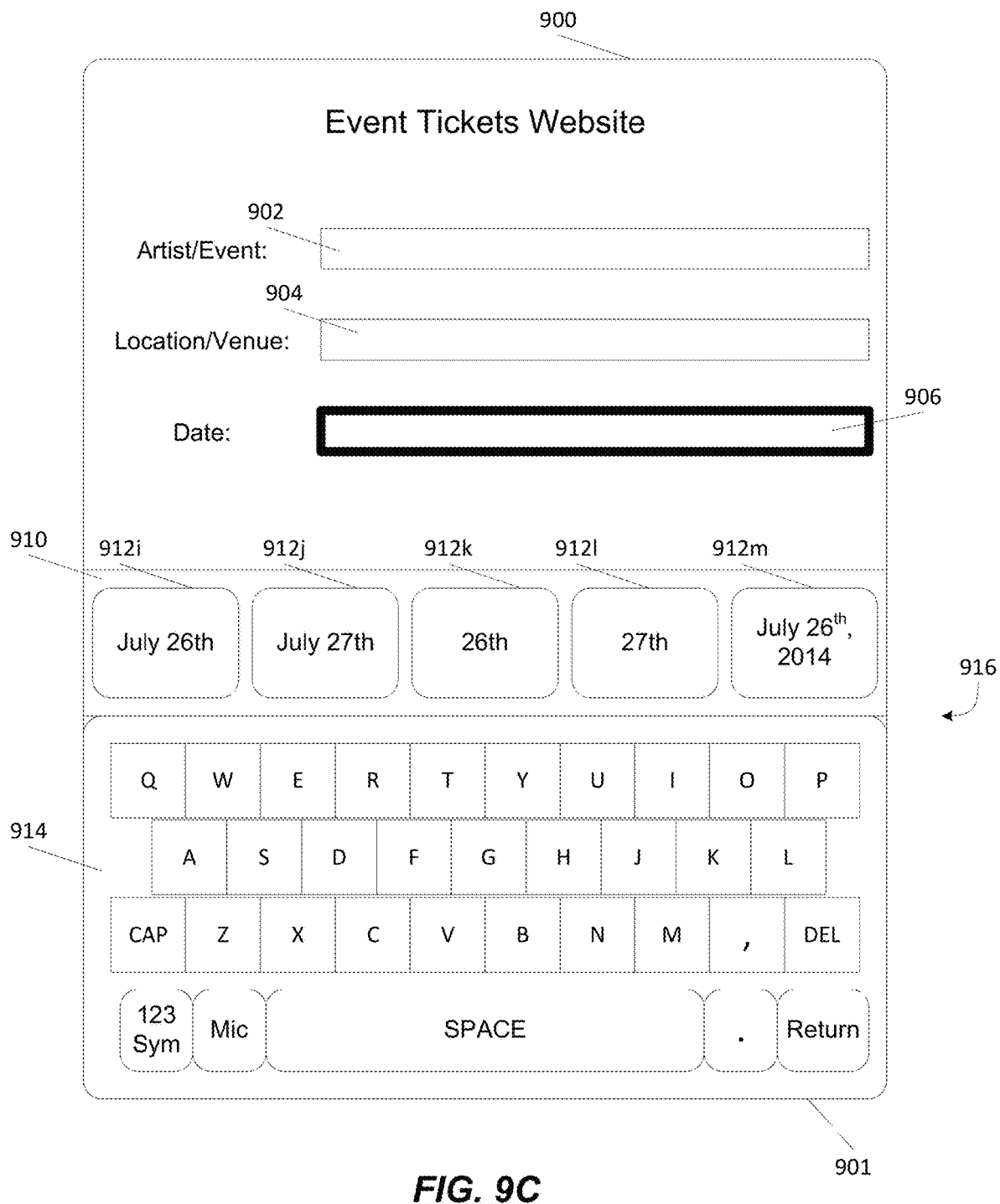
FIG. 9C depicts an illustrative diagram showing an example an example browser application in accordance with one or more disclosed aspects.

FIG. 9C illustrates an example diagram of the display 901 displaying the browser application 900 showing the webpage 908 that may be implemented on a device such as devices 103, 105, 107, and/or 109 in accordance with disclosed aspects. As stated above for FIG. 9A, concepts associated with a subject matter or type of a text field may be displayed in a suggestion box, such as suggestion box 910. For example, as shown in FIG. 9C, the focus/cursor may be on the text field 906, which may correspond to a date or date range associated with an event listed on the website. Thus, when the focus/cursor is on text field 906 (e.g., text field 906 is shown as having a darkened perimeter), the suggestions shown in suggestion box 910 may correspond to identified concepts corresponding to a date, because the text field 904 is used to search for events based on date. According, as shown in FIG. 9C, the suggestions may include concepts having an associated category of Date (e.g., 402d in FIG. 4). For example, suggestion 912i may correspond to the concept "July 26th," suggestion 912j may correspond to the concept "July 27th," suggestion 912k may correspond to the concept "26th," suggestion 912l may correspond to the concept "27th," and suggestion 912m may correspond to the concept "Jul. 26, 2014." According to some aspects, the ranking and/or association between the subject matter or type of text field (e.g., artist, etc.) may be based on HTML (or other code) that may contain information about the type of data that may be input into a particular text field. For example, the HTML used to implement the text field 906 may include code that states that only dates may be input into text field 906. Accordingly, the parsing mechanism may inspect the HTML (or other code) used to implement text field 906 to determine and/or rank the concepts for that field. In the above example, HTML may determine that the Date concepts may be ranked higher than other concepts because the HTML for text field 906 may indicate that only Dates may be entered. While the above example discusses dates as an illustration, any other type of concept may be used, such as location, artists, and the like.

According to some aspects, a user may input a first concept into a text field using a first type of input selection, and may input additional concepts into the text field using a different type of input selection. For example, if the concepts cache has stored for the category of "Date" the concepts "$26^{th}$" (e.g., surface form) and "July $26^{th}$" (e.g., canonical form), the user may input the surface form by short pressing (or perform some other input) on a text field, and may input the canonical form by long pressing (or perform some other input) on a text field. Alternatively, the user may, for example, long press (or perform some other input) on the text field, which may then produce, in a suggestion box, suggestions for the concepts "$26^{th}$" and "July $26^{th}$" from either of which the user may then select.

While the examples herein are related to text message applications, browser applications, media player applications, and email applications, disclosed aspects may be used with any application, such as text-based applications, speech-based applications, and the like.

Figure 10:
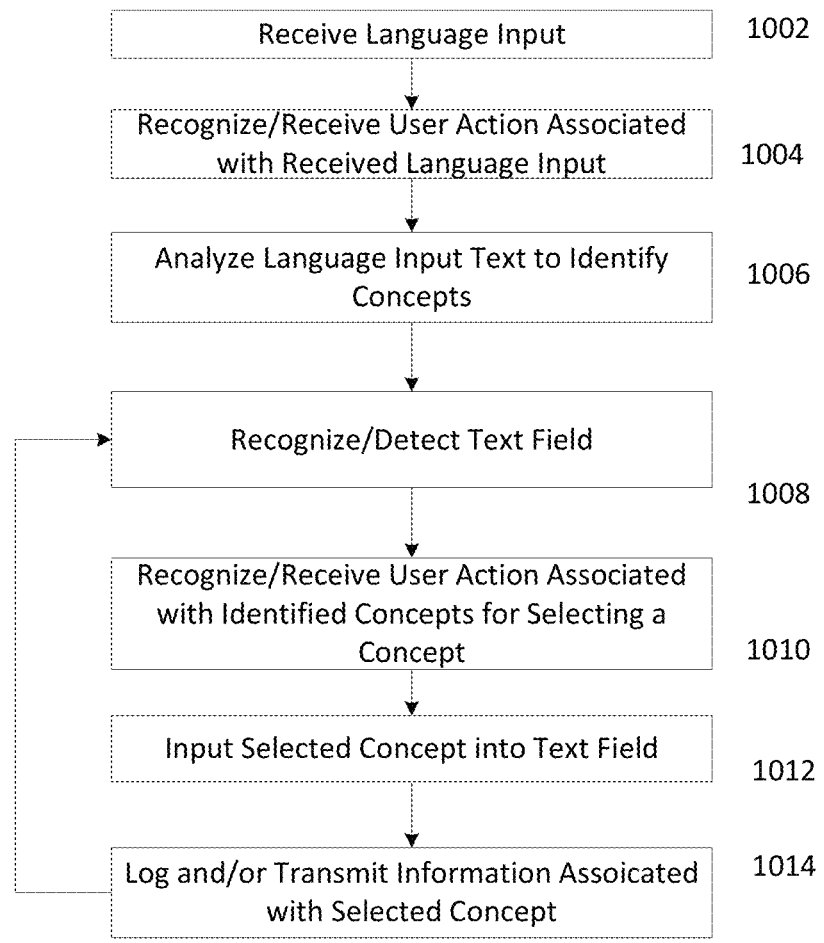
FIG. 10 depicts an illustrative flow diagram showing an example process of concept identification and capture in accordance with one or more disclosed aspects.

FIG. 10 is an illustrative process 1000 illustrating a flow schematic of a parsing mechanism for concept identification and input in accordance with one or more features described herein. In one or more embodiments, the process 1000 illustrated in FIG. 10 and/or one or more steps thereof may be performed by a computing device, such as devices 103, 105, 107, and/or 109. In other embodiments, the process illustrated in FIG. 10 and/or one or more steps thereof may be embodied in computer-executable instructions that are stored in a computer-readable medium, such as a non-transitory computer-readable memory. Any of the disclosed steps in FIG. 10 (and/or associated descriptions herein) may be omitted, be performed in other than the recited order, repeated, and/or combined.

Process 1000 may begin with step 1002, in which a language input (e.g., text-based, natural language, etc.) may be received by an application on a computing device. The language input may be displayed a text on a display screen of the device. The application may be, for example, a text-messaging based application (e.g., SMS, TMS), a messing application (e.g., instant messaging services such as WhatsApp, etc.), an email application, a web browser, a word processing application, and/or any text-based application. For example, as shown above in FIG. 4, a user may type a text message 202 stating "Did you see Jennifer Lopez's video?" The user may receive a text message 204 from the user's friend that might state "yeah awesome!!! I heard she is coming to the Gardens on the 26$^{th}$ and 27$^{th}$. The song I Love You is beautiful, but I really like JLo's on the floor with pitbull."

At step 1004, the device and/or application may recognize/receive a user action related to the language input. For example, the user may long or short press in the proximity of a portion of the language input, right click, tap a display, tapping a button (e.g., on a soft keyboard or other input device), select/highlight text, or perform some other input. In one example, an option to "analyze concepts" may then be displayed to the user to analyze proximate text and/or selected text to identify one or more concepts/named-entities according to one or more disclosed features. According to some aspects, a user action might not be needed to initiate the action of analyzing text for one or more concepts/named-entities. For example, text may be analyzed for one or more concepts/named-entities after text is entered into a soft keyboard of a user, such as when a user is typing a text message. Text may be analyzed for one or more concepts/named-entities after text is entered via a voice prompt into a device. Text may be analyzed for one or more concepts/named-entities by intercepting text that may have been received and/or transmitted by a device, and automatically analyzing that text. For example, the device may intercept short, highly targeted items, such as SMS messages, and analyze them for one or more concepts/named-entities. In some situations, highlighted text may be automatically analyzed for concepts by the parsing mechanism.

At step 1006, the device and/or application may analyze the text (e.g., selected or identified text) of the language input to identify named entities and/or concepts within and/or associated with the analyzed text. Thus, a user may parse/analyze the text to identify concepts/named entities that may, for example, be used as text-based input in the same application or another application. For example, semantic relationships may be identified for concepts/named-entities in (or associated) with the analyzed text, such as shown in FIG. 4. The relationships may be between, for example, hyponyms and hypernyms. For example, as shown in FIG. 4, the concepts of "I Love You" (404*f*) and "On the Floor" (404*g*) may be hyponyms for the "Song" hypernym 402*b*). According to some embodiments, the hypernym may be a category or classification for one or more hyponyms. For example, the concepts of "I Love You" (404*f*) and "On the Floor" (404*g*) may be categorized/classified as songs (e.g., because they name songs by Jennifer Lopez), and thus may be associated with the "Song" hypernym (402*b*). According to some aspects, a hypernym may be a hyponym. For example, the hypernyms of "Song" 402*b* and "Artist" 402*a* may be hyponyms for the hypernym "Art" or the like.

At step 1008, the computing device may detect a text field, such as a text field in and/or associated with an application running on the computing device. For example, a user may wish to search for the song "I Love You" in a media player application. The user may open the media player application, and then move the focus or cursor to a search text field. After the text box is detected, one or more of the identified concepts may be displayed to the user as suggestions for entering into the text box. The displayed concepts may comprise concepts ranked higher than other non-displayed concepts, such as discussed above. According to some aspects, a text field may be detected via one or more features and/or components of an operating system and/or application. For example, an "auto-fill" feature, such as an auto-fill contact information feature, may be used to detect a text field. For example, on an online shopping site, the auto-fill feature may begin to and/or prompt a user to fill in an address text field with the user's address after the user inputs the user's name in a separate name text field. Thus, disclosed aspects may detect a text field and/or determine a type of text field via the auto-fill feature implemented on an application and/or operating system. Additionally, any metadata or other information may be used to determine a type of text field. For example, a text field may be preceded by "Artist," and disclosed aspects may determine that the text field following the word "Artist" might relate and/or correspond to an Artist concept.

According to some aspects, the text field may be detected after the user opens the application without the user moving the focus or cursor to a text field. Thus, in some situations, one or more of the identified concepts may be displayed to the user as suggestion for entering into the text box. In some situations, one or more of the identified concepts, such as a highest ranked concept or higher ranked concept(s), may be automatically input into a text field (e.g., without a user moving the focus or cursor to a text field).

At step 1010, the device and/or application may receive/recognize a user action associated with the identified concepts. For example, the user may select a concept displayed as a suggestion for input into a text field. In some situations, the user may short press on a text box to have a concept entered into the text box (e.g., a highest or higher ranked concept). In some situations, if the user does not see a desired suggestion, the user may scroll through displayed suggestions, such that different suggestions (e.g., corresponding to different concepts and/or lower ranked concepts) may be displayed to the user.

At step 1012, the selected concept/suggestion may be input into the text field. In some situations, as stated above, a concept may be automatically input into a text field, such as in response to detecting the text field. According to some aspects, the canonical form or the surface form of a concept may be input into a text field. For example, if the text field is the search box of a search engine, then a surface form of a date concept may be used. In another example, if the application relates to making flight reservations on a web site (e.g., which may use a little calendar icon for aiding in the input), then the canonical form of a date concept may be used.

At step 1014, information associated with the selection and/or input/insertion of a concept/suggestion may be logged and/or transmitted to a server and/or database, which may be associated with an enterprise entity, such as a business, that may own, control, and/or be otherwise associated with the disclosed parsing mechanism. The information may include which concepts/suggestions were inserted, which concepts/suggestions were rejected, scrolled over, and/or not inserted, whether a higher ranked (or lower ranked) concept/suggestion was inserted, from which application the text was analyzed by the parsing mechanism, to which application the concepts/suggestions were displayed/associated and/or inserted into, whether the parsing technique identified correct categories for named-entities/concepts, whether surface and canonical forms were correctly identified, the analyzed text, non-analyzed text, location of a device or user, any modification/correction to a concept/suggestion that was inserted, and the like. The information may be in statistical form. According to some aspects, the server and/or database (or other computing device) may update the parsing mechanism (e.g., on the device that sent the information or on other devices implementing the parsing mechanism) based on this information, such as via a software update. According to some aspects, the enterprise entity (or other entity or associated computing device) may update the parsing mechanism (e.g., on the device that sent the information or on other devices implementing the parsing mechanism) based on this information, such as via a software update.

Process 1000 may then return to step 1008 to determine if a text field (e.g., the same text field or different text field) is detected. Process 1000 may end after any step of process 1000.

One or more embodiments may be implemented in any conventional computer programming language. For example, embodiments may be implemented in a procedural programming language (e.g., "C") or an object-oriented programming language (e.g., "C++", Python). Some embodiments may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions may embody all or part of the functionality previously described herein with respect to the system. Such computer instructions may be written in a number of programming languages for use with one or more computer architectures or operating systems. Furthermore, such instructions may be stored in any memory device, such as semiconductor, magnetic, optical, or other memory devices, and may be transmitted using any communications technology, such as optical, infrared, microwave, or other transmission technologies. Such a computer program product may be distributed as a removable medium with accompanying printed or electronic documentation (e.g., shrink wrapped software), preloaded with a computer system (e.g., on system ROM or fixed disk), or distributed from a server or electronic bulletin board over a network (e.g., the Internet or World Wide Web). Some embodiments may be implemented as a combination of both software (e.g., a computer program product) and hardware. Still other embodiments may be implemented as entirely hardware, or entirely software (e.g., a computer program product).

A described "process" is the performance of a described function in a computer using computer hardware (such as a processor, domain-programmable gate array, or other electronic combinatorial logic, or similar device), which may be operating under control of software or firmware or a combination of any of these or operating outside control of any of the foregoing. All or part of the described function may be performed by active or passive electronic components, such as transistors or resistors. Use of the term "process" does not necessarily imply a schedulable entity, although, in some embodiments, a process may be implemented by such a schedulable entity. Furthermore, unless the context otherwise requires, a "process" may be implemented using more than one processor or more than one (single- or multi-processor) computer and it may be an instance of a computer program or an instance of a subset of the instructions of a computer program.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing devices and one or more networks. The functionality may be distributed in any manner, or may be located in a single computing device (e.g., a server, a client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
    determining one or more terms in a message being displayed by a first user interface of a first application;
    analyzing the one or more terms to determine a concept indicated by the one or more terms and to determine a category associated with the concept;
    determining, based on analyzing a second user interface of a second application, that a text input field is being displayed by the second user interface, wherein the text input field is configured to receive and display text input;
    determining that the text input field is associated with the category;
    displaying, on the second user interface of the second application, one or more user-selectable suggestions of an input for the text input field based upon, at least in part, determining that the text input field is associated with the category, wherein the one or more user-selectable suggestions are associated with the concept determined by analyzing the one or more terms in the message displayed by the first user interface of the first application; and
    based on a user selection of a user-selectable suggestion of the one or more user-selectable suggestions, inputting the user-selectable suggestion into the text input field.

2. The method of claim 1, wherein the analyzing the one or more terms is performed based on user settings of the first application.

3. The method of claim 1, wherein the first application comprises one of an email application and a text message application.

4. The method of claim 1, wherein the second user interface comprises a soft keyboard, and wherein the one or more user-selectable suggestions is displayed with the soft keyboard.

5. The method of claim 1, wherein the one or more user-selectable suggestions displayed are ranked higher than at least one non-displayed user-selectable suggestion associated with the concept.

6. The method of claim 1, wherein the one or more user-selectable suggestions displayed are ranked based upon one of popularity, location information, and code associated with the text input field.

7. One or more non-transitory computer readable media storing computer executable instructions that, when executed, cause a computing device to perform operations comprising:
   determining one or more terms in a message being displayed by a first user interface of a first application;
   analyzing the one or more terms to determine a concept indicated by the one or more terms and to determine a category associated with the concept;
   determining, based on an analysis of a second user interface of a second application, that a text input field is being displayed by the second user interface, wherein the text input field is configured to receive and display text input
   determining that the text input field is associated with the category;
   displaying, on the second user interface of the second application, one or more user-selectable suggestions of an input for the text input field based upon, at least in part, determining that the text input field is associated with the category, wherein the one or more user-selectable suggestions are associated with the concept determined by analyzing the one or more terms in the message displayed by the first user interface of the first application; and
   based on a user selection of a user-selectable suggestion of the one or more user-selectable suggestions, inputting the user-selectable suggestion into the text input field.

8. The one or more non-transitory computer readable media of claim 7, wherein analyzing the one or more terms is performed based on user settings of the first application.

9. The one or more non-transitory computer readable media of claim 7, wherein the first application comprises one of an email application and a text message application.

10. The one or more non-transitory computer readable media of claim 7, wherein the one or more user-selectable suggestions displayed are ranked higher than at least one non-displayed user-selectable suggestion associated with the concept.

11. The one or more non-transitory computer readable media of claim 7, wherein the one or more user-selectable suggestions displayed are ranked based upon one of popularity, location information, and code associated with the text input field.

12. A computing device comprising:
   one or more processors; and
   memory storing computer executable instructions that, when executed by the one or more processors, cause the computing device to perform operations comprising:
     determining one or more terms in a message being displayed by a first user interface of a first application;
     analyzing the one or more terms to determine a concept indicated by the one or more terms and to determine a category associated with the concept;
     determining, based on an analysis of a second user interface of a second application, that a text input field is being displayed by the second user interface, wherein the text input field is configured to receive and display text input;
     determining that the text input field is associated with the category;
     displaying, on the second user interface of the second application, one or more user-selectable suggestions of an input for the text input field based upon, at least in part, determining that the text input field is associated with the category, wherein the one or more user-selectable suggestions are associated with the concept determined by analyzing the one or more terms in the message displayed by the first user interface of the first application; and
     based on a user selection of a user-selectable suggestion of the one or more user-selectable suggestions, inputting the user-selectable suggestion into the text input field.

13. The computing device of claim 12, wherein analyzing the one or more terms is performed based on user settings of the first application.

14. The computing device of claim 12, wherein the first application comprises one of an email application and a text message application.

15. The computing device of claim 12, wherein the one or more user-selectable suggestions displayed are ranked higher than at least one non-displayed user-selectable suggestion associated with the concept.

16. The computing device of claim 12, wherein the one or more user-selectable suggestions displayed are ranked based upon one of popularity, location information, and code associated with the text input field.

17. The method of claim 1, wherein determining that the text input field is being displayed by the second user interface is performed when the text input field is empty.

18. The method of claim 1, wherein the category determined to be associated with the text input field includes one of a date, a venue, an artist, an event, a text message, a URL, and an email.

19. The method of claim 1, wherein text input field comprises code indicating the text input field is an auto-fill text input field.

20. The one or more non-transitory computer readable media of claim 7, wherein the category associated with the text input field is determined based upon, at least in part, metadata of the second user interface associated with the text input field.

21. The method of claim 1, wherein the category associated with the text input field is determined based upon, at least in part, metadata of the second user interface associated with the text input field.

* * * * *